(12) United States Patent
Lubkoll et al.

(10) Patent No.: US 11,254,834 B2
(45) Date of Patent: Feb. 22, 2022

(54) COATING OR INKS COMPOSITIONS COMPRISING STARCH DERIVATIVES, THEIR USES AND SUBSTRATES COMPRISING SUCH COMPOSITIONS

(71) Applicant: Rhodia Acetow GmbH, Freiburg (DE)

(72) Inventors: Jana Lubkoll, Freiburg (DE); Armin Stein, Kenzingen (DE)

(73) Assignee: Rhodia Acetow GmbH, Freiburg (DE)

( * ) Notice: Subject to any disclaimer, the term of this patent is extended or adjusted under 35 U.S.C. 154(b) by 328 days.

(21) Appl. No.: 15/766,934

(22) PCT Filed: Oct. 6, 2016

(86) PCT No.: PCT/EP2016/073908
§ 371 (c)(1),
(2) Date: Apr. 9, 2018

(87) PCT Pub. No.: WO2017/060370
PCT Pub. Date: Apr. 13, 2017

(65) Prior Publication Data
US 2018/0291224 A1  Oct. 11, 2018

(30) Foreign Application Priority Data
Oct. 7, 2015 (EP) .................................... 15188773

(51) Int. Cl.
| | | |
|---|---|---|
| C09D 103/00 | (2006.01) |
| C09D 103/02 | (2006.01) |
| C09D 103/06 | (2006.01) |
| C09D 103/04 | (2006.01) |
| C09D 7/41 | (2018.01) |
| B41N 1/08 | (2006.01) |
| C09D 11/037 | (2014.01) |
| C09D 11/14 | (2006.01) |

(52) U.S. Cl.
CPC .......... *C09D 103/02* (2013.01); *B41N 1/083* (2013.01); *C09D 7/41* (2018.01); *C09D 11/037* (2013.01); *C09D 11/14* (2013.01); *C09D 103/04* (2013.01); *C09D 103/06* (2013.01); *B41P 2200/12* (2013.01); *B41P 2200/20* (2013.01); *B41P 2200/40* (2013.01)

(58) Field of Classification Search
None
See application file for complete search history.

(56) References Cited

U.S. PATENT DOCUMENTS

| | | | |
|---|---|---|---|
| 4,011,392 A * | 3/1977 | Rudolph | C08B 31/04 |
| | | | 536/108 |
| 4,095,992 A | 6/1978 | Rudolph et al. | |
| 7,485,689 B2 | 2/2009 | Stevens et al. | |
| 10,000,666 B2 | 6/2018 | Hawkins et al. | |
| 2007/0213412 A1* | 9/2007 | Bacon | A61F 13/8405 |
| | | | 516/53 |
| 2008/0206571 A1* | 8/2008 | Berckmans | D21H 19/54 |
| | | | 428/411.1 |
| 2011/0086567 A1 | 4/2011 | Hawkins et al. | |
| 2011/0229700 A1* | 9/2011 | Troutman | C09D 11/08 |
| | | | 428/195.1 |
| 2015/0159000 A1 | 6/2015 | Rand et al. | |
| 2015/0257766 A1 | 9/2015 | Hen et al. | |
| 2016/0257767 A1* | 9/2016 | Lubkoll | C08B 33/02 |

FOREIGN PATENT DOCUMENTS

| | | | | |
|---|---|---|---|---|
| EP | 1108726 A1 | 6/2001 | | |
| EP | 2862881 A1 | 4/2015 | | |
| JP | 2005-139122 A | 6/2005 | | |
| JP | 2007-176908 A | 7/2007 | | |
| JP | 2007-254299 A | 10/2007 | | |
| JP | 2011-168804 A | 9/2011 | | |
| JP | 2015-040269 A | 3/2015 | | |
| JP | 2015-065925 A | 4/2015 | | |
| KR | 101392328 B1 * | 5/2014 | .......... | B42D 25/425 |
| WO | 2008/104574 A1 | 9/2008 | | |
| WO | 2010/059562 A1 | 5/2010 | | |
| WO | WO-2010055210 A1 * | 5/2010 | .......... | B42D 25/425 |
| WO | WO2010059562 * | 5/2010 | | |
| WO | 2016/031525 A1 | 3/2016 | | |

OTHER PUBLICATIONS

Dunn et al, Branching Ratios of Starch via Proton Nuclear Magnetic Resonance and Their Use in Determining Amylose/Amylopectin Content: Evidence for Three Types of Amylopectin, Macromol. Symp. 140, 179-186 (Year: 1999).*
KR-101392328-B1—English translation (Year: 2014).*
International Search Report issued in Application No. PCT/EP2016/073908, dated Jul. 12, 2016.
Partial English Translation of Japanese Patent Office Action for Application No. 2018-517878 dated Apr. 9, 2019 (6 pages).
Garg, Sangeeta; Jana, Asim Kumar. "Characterization and evaluation of acylated starch with different acyl groups and degrees of substitution." Carbohydrate Polymers, vol. 83, Issue 4, Feb. 2011, p. 1623-1630.
English translation of Chinese Patent Office Action for Application No. 201680057850.2 dated Sep. 16, 2019 (11 pages).
Translation of National Intellectual Property Administration, P.R.C., Third Office Action for Application No. 201680057850.2 dated Feb. 3, 2021 (10 pages).

* cited by examiner

*Primary Examiner* — Stefanie J Cohen
(74) *Attorney, Agent, or Firm* — Michael Best & Friedrich LLP

(57) ABSTRACT

This application relates to coating and inks compositions comprising starch derivatives, their uses and substrates comprising such compositions.

16 Claims, No Drawings

COATING OR INKS COMPOSITIONS COMPRISING STARCH DERIVATIVES, THEIR USES AND SUBSTRATES COMPRISING SUCH COMPOSITIONS

This application claims priority to European application No. EP 15188773.4, the whole content of this application being incorporated herein by reference for all purposes.

This application relates to coating and inks compositions comprising starch derivatives, their uses and substrates comprising such compositions.

Coating and ink compositions often comprise organic binders such as nitrocellulose or polyurethanes. Starch and starch derivatives have been studied as alternatives for conventional binders, for example in WO2010/059562. Starch and starch derivatives are made from renewable sources and generally have a favourable carbon footprint which makes them environmentally friendly alternatives over petroleum based resins and binders. Nitrocellulose often displays a low solids content when used as binder, which translates to high VOC, and often displays poor chemical and heat resistance. Nitrocellulose is also commonly made from cotton, which is known to be a water-intensive plant, being cultivated only in certain geographical regions; further, the manufacturing method for nitrocellulose has some disadvantages.

It has now been found that a coating or ink composition comprising at least one acylated starch derivative, wherein the dextrose equivalence of the at least one acylated starch derivative is from 0.01 to 4.95, preferably from 0.01 to 2.95, and which optionally further comprises at least one colorant, allows to achieve advantageous physical properties, such as good dispersibility of colorants comprised in the composition, which often translates to a good colour strength and mileage. Such compositions further display good water and/or gas, in particular oxygen, barrier properties, what is advantageous in the electronics and food packaging industry.

Consequently, the invention concerns a coating or ink composition comprising at least one starch derivative, wherein the dextrose equivalence of the at least one starch derivative is from 0.01 to 4.95, preferably from 0.01 to 2.95, and which optionally further comprises at least one colorant. The invention further concerns the use of the coating composition or ink composition according to the present invention in a printing process, and further substrates comprising the coating composition or ink composition according to the present invention.

The term «coating» is intended to denote in particular compositions suitable for depositing a layer of material on a surface of a substrate such as varnishes, paints or lacquers. A coating can be applied to substrates, for example to enhance their resistance toward heat, weather, light, chemicals or physical impact, or to form or to enhance a barrier function, such as forming or enhancing a barrier on the substrate against a liquid or a gas, such as water, air or oxygen. Further, a coating can be applied to a substrate to alter the appearance of the substrate, for example for application of a colorant. This also includes cosmetic coatings, such as nail polish.

The term «inks» is intended to denote a composition often comprising at least one colorant, which has a viscosity adequate for application through techniques such as printing and pen-writing and which is often applied by a printing process to a substrate to apply a text or decorative elements to a substrate.

The term «starch derivative» is intended to denote in particular a chemically and/or physically modified starch. Starches can, for example, be physically modified by degradation by heat to polysaccharide chains with lower molecular weight. Chemically modified starch derivatives include starch derivatives which have been manufactured by acidic digestion of starches to form lower molecular weight starch derivatives, or by digestion though enzymes which can degrade starch molecules to lower molecular weight starch molecules. In a preferred aspect, chemically modified starch derivatives denote starches which have been etherified or acylated partially or fully at the hydroxyl groups available along the polysaccharide chain. Most preferably, the invention relates to acetylated starch derivatives, such as starch acetates, starch propionates, starch butanoates, starch hexanoates and other acylated starch derivatives; this also includes mixed acylated starches or starches which have been acylated with functionalized acyl groups, such as trifluoroactate. Preferred modified starch derivatives are acylated starch derivatives, and more preferably acetylated starch derivatives. The most preferred acylated starch derivative is starch acetate. Acylated starches can be prepared, for example, by reaction with acid halides or acid anhydrides, as described in the processes of WO2015055734, WO 2015055742 or WO 2015055741, which are hereby incorporated by reference in their entirety. Another option is going through the mixed anhydride formed through the reaction of starch with an acylation promotor, such as trifluoro acetic acid anhydride and subsequent reaction with an alcohol, as described, for example, in B. Y. Yang et al, «Acylation of Starch using Trifluoroacetic Anhydride Promoter», Starch 58 (2006) 520-526.

According to the present invention, the starch employed as starting material for the at least one starch derivative can comprise predominantly amylose or, conversely, predominantly amylopectin (waxy starch). Generally, whole starch and/or isolated fractions of amylose and/or isolated fractions of amylopectin can be used. According to the present invention, the term "polymer comprising amylose and/or amylopectin" includes its preferred form, namely "starch". The starches can be derived from any native source, wherein native relates to the fact that said starch is found in nature. Unless specifically distinguished, references to starch in this specification are meant to include their corresponding flours, which are still containing proteins, such as wheat gluten (hereinafter "starch"). In the present invention, a single or several starch sources can be used. The starch may also be combined out of several sources, isolated amylose fractions and/or amylopectin fractions, and/or derivatives like chemically or physically modified starch, which will be explained further below. Typical sources for the starches are cereals, tubers, roots, legumes, fruit starches and hybrid starches. Suitable sources include but are not limited to, millet, pea, potato, sweet potato, maize, sorghum, banana, barley, wheat, rice, sago, amaranth, tapioca, arrowroot and cannay. Preferred sources according to the present invention are selected from the group consisting of tubers, legumes or cereals. Even more preferably, the starch source is selected from the group consisting of pea, potato, sweet potato, wheat and maize. Most preferably, maize with a high amylopectin content (waxy maize) is used as starch source. Also suitable are starches derived from a plant obtained by breeding techniques including crossbreeding, translocation, inversion, transformation or any other method of gene or chromosome engineering to include variations thereof.

In its broadest aspect, the dextrose equivalence of the at least one starch derivative comprised a coating or ink composition is from 0.01 to 4.95, preferably from 0.01 to 2.95. The dextrose equivalence (DE) denotes the percentage of reducing sugars calculated as dextrose (glucose) on a dry weight basis. It is measured by the Lane-Eynon method, which is known to the person skilled in the art and described, for example, in ISO 5377:1981 standard. The dextrose equivalence does not necessarily relate strictly to the chain length and thus molecular weight of starch or starch derivatives; if a starch or starch derivative contains a relatively high amount of amylopectin, the branched form of amylose, degradation of the branches will also influence the DE in the resulting starch derivative. It has been found that coating or ink compositions comprising starch derivatives, in particular acylated starch derivatives and most particularly starch acetates with a DE from 0.01 to 4.95, preferably from 0.01 to 2.95, often show particularly good characteristics, such as dispersibility of other components, such as colorants, high solids contents and thus low VOC, good print densities, gloss, water resistance, adhesion to substrate, durability, color strength, pigment wetting, rheology and low toxicity. The DE can, for example, be realized by choice of starch starting material and/or application of certain degradation processes, such as acidic treatment of starch. Care should be taken, for example by choosing the correct amount of acids, nature of acid, reaction conditions such as temperature and duration of degradation, not to "over degrade" the starch and thus to arrive at starch derivatives with a DE higher than 4.95. Advantageously, a process as described in WO2015055741 can be applied. Often, the DE of the starch derivative, preferably the starch acetate, is equal to or larger than 0.01, preferably equal to or larger than 0.1, and more preferably equal to or larger than 0.5. Generally, the DE is equal to or lower than 4.95, preferably equal to or lower than 4.5, and most preferably equal to or lower than 4.1. In a preferred aspect, the DE is from 1.8 to 2.9, for example 2.4, 2.5 or 2.6. A DE of about 2.4 is most preferred.

In one aspect of the present invention, the branching ratio of the at least one starch derivative, preferably the starch acetate, is from 1 to 20, preferably from 1 15 and most preferably from 1 to 10. The branching ratio denotes the number of branches with a reducing end comprised in a starch derivative over the terminal reducing end of the main polysaccharide chain. For example, a branching ratio of 7 denotes 7 branches with a reducing end in a polysaccharide chain with one terminal reducing end. The branching ratio can be suitably determined by calculation from the integrals of a 1H NMR of the starch derivative. Preferred branching ratios are 5, 6, 7, 8, and 9, wherein 7 is a most preferred branching ratio.

In another aspect of the present invention, the at least one starch derivative has a molecular weight of equal to or more than 3.700 g/mol. Generally, the molecular weight of the at least one starch is equal to or more than 3.700 g/mol, preferably equal to or more than 4.000 daltons and most preferably equal to or more than 5.000 daltons. Generally, the molecular weight of the at least one starch is equal to or less than 50.000 daltons, preferably equal to or less than 40.000 daltons and most preferably equal to or less than 20.000 daltons. Often, the molecular weight is from 3.700 to 50.000 daltons, more preferably from 4.000 to 40.000 daltons and most preferably from 5.000 to 20.000 daltons. The molecular weight refers to the molecular weight of the starch derivative, for example the starch acetate. The term "molecular weight" intends to denote the number average molecular weight of the starch derivative. The molecular weight is determined according to well accepted methods, such as GPC (gel permeation chromatography) determination.

In one aspect of the present invention, the at least one starch derivative comprised in the coating or ink composition according the invention has a viscosity from between 10 to 200 mPas (35 weight % in EtOAc at 25° C.). The viscosity is measured in a 35% (w/w) solution in EtOAc at 25° C. with a rotational viscosimeter, such as Rheomat R180 (ProRheo). Preferably, the viscosity is equal to or larger than 10 mPas. Even more preferably, viscosity is equal to or larger than 12 mPas. Generally, the viscosity is equal to or less than 200 mPas. More preferably, the viscosity is equal to or less than 190 mPas. In a most preferred embodiment, the viscosity is from 15 to 180 mPas.

In a further aspect of the present invention, the starch from which the at least one starch derivative comprised in the coating or ink composition according the invention was manufactured, had an amylose content of from 0 to 20 weight %. Often, and preferably, the starch from which the at least one starch derivative comprised in the coating or ink composition according the invention was manufactured is a waxy maize starch.

According to the present invention, the at least one starch derivative, preferably starch acetate, comprised in the coating or ink composition according the invention advantageously has a Tg (glass transition temperature) of from 100-170° C. Often, the Tg is equal to or more than 100° C., more preferably equal to or more than 105° C. and most preferably equal to or more than 110° C. Generally, the Tg is equal to or lower than 180° C., more preferably equal to or lower than 175° C. and most preferably equal to or lower than 170° C. The glass transition temperature can be measure, for example, by Differential Scanning Calorimetry (DTA/DSC) or Dilatometry.

In one aspect of the present invention, at least one starch derivative comprised in the coating or ink composition according to the invention is an acylated starch derivative, preferably an acylated starch derivative and most preferably starch acetate, having a degree of substitution (DS) from 2.0 to 2.9. Preferably, the DS of the at least one starch derivative is greater than 2.05. More preferably, the DS of the at least one starch derivative is equal to or greater than 2.07. Most preferably, the DS of the at least one starch derivative is equal to or greater than 2.1. Preferably, the DS of the at least one starch derivative is equal to or less than 2.6. More preferably, the DS of the at least one starch derivative is equal to or less than 2.5. Even more preferably, the DS of the at least one starch derivative is equal to or less than 2.4. In a most preferred embodiment of this invention, the DS of the at least one starch derivative is from 2.1 to 2.4. The DS can be determined by methods known in the art, for example 1H NMR, hydrolysis or TGA/IR (combined thermogravimetric analysis/infrared method).

In a further aspect of the present invention, the coating or ink composition according to the invention comprises at least one colorant in the amount of from 1 to 35, preferably from 5 to 25 weight %. Often, the at least one colorant is comprised in an amount of equal to or more than 1 weight %, or equal to or more than 3 weight %, or equal to or more than 5 weight %. Also, often the at least one colorant is comprised in an amount of equal to or lower than 35 weight %, or equal to or lower than 30 weight %, or equal to or lower than 25 weight %.

The at least one colorant comprised in the composition according to the invention include, but are not limited to dyes, organic or inorganic pigments. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83; Pigment Red Numbers 2, 22, 5 23, 48:1, 48:2, 52, 53, 57:1, 122, 166, 170, 266; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White 10 Numbers 6 and 7. Other organic and inorganic pigments and dyes can also be employed, as well as combinations that achieve the colors desired. Other organic and inorganic pigments appropriate for the colors desired can also be used. Especially preferred colorants are Pigment Blue 15:4, TiO2 and Pigment Black 7.

In one aspect, the coating or ink composition according to the invention comprises further at least one further component selected from the group consisting of binders and solvents. Suitable binders may be, for example, acrylics and/or polyurethanes. The presence of acrylic binders can render the composition radiation curable. Often, at least one solvent is comprised in the composition. The term "solvent" also intends to denote fluids in which the components are dispersed. Solvents are, in one aspect, selected from polar solvents, such as water or alcohols, in particular methanol, ethanol and n- or i-propanol, wherein ethanol is preferred of the alcohols. In one aspect, derivatized alcohols, such as ethoxypropanol, have proven to be very suitable. Water is another very preferred polar solvent. In another aspect, the solvent is or solvents are selected from less or non-polar solvents, such as ketones, esters, ethers, in particular ethyl acetate, acetone and methyl ethyl ketone.

The invention also relates to the use of the coating composition or ink composition according to the invention in a printing process, wherein the printing process is selected from the group consisting of flexography, screen printing, gravure printing and lithography. Flexography is a particularly preferred printing process in which the coating composition or ink composition according to the invention can be used. In the uses as described before, the coating composition or ink composition comprising at least one starch derivative, wherein the dextrose equivalence of the at least one starch derivative is from 0.01 to 4.95, preferably from 0.01 to 2.95, is applied to a substrate selected from the group consisting of paper, tissue, fabrics, plastic film, plastic, glass, metal foil, preferably metal foils comprising aluminum. In one aspect, the use for printing on paper is preferred. In another aspect, the use for printing on plastic film or metal foil is preferred, which can be particularly useful in the food, nutrition or pharmaceuticals packaging industry. The use for metal foil, preferably metal foils comprising aluminum, is another very suitable use for packaging material used in the food or nutrition industry. In one advantageous embodiment, coating or ink composition is a UV curable coating or ink composition.

In another aspect, the coating or ink composition is used for printing or coating of electronic parts or devices. This can be particularly useful in the formation of a moisture and/or gas barrier, for example to keep a gas, for example an insulating gas, inside an electronic device, or moisture out of the device.

In another aspect, the coating or ink composition comprises at least one flux. Such a flux is suitable for eliminating metal oxide layers from metal parts to be joined, for example aluminum or aluminum alloy parts to be brazed. Very suitable fluxes include potassium fluoroaluminates, cesium fluoroaluminates, alkali fluorozincates, preferably potassium fluorozincate, and alkali fluorosilicates.

The invention also relates to a substrate selected from the group consisting of paper, tissue, fabrics, plastic film, plastic, glass, metal foil, preferably metal foils comprising aluminum, which comprises the coating composition or ink composition according to the invention. The invention also relates to metal parts, especially aluminum or aluminum alloy parts, which are at least partially coated with a coating or ink composition according to the invention, which further also comprises at least one flux. The term "comprises the coating composition or ink composition according to the invention" intend to denote in this context also the dried and/or coating composition or ink composition after application to its substrate.

In one embodiment, the starch derivative comprised in the coating or ink composition according to the present invention is an acylated starch derivative which is manufactured according to a process comprising the steps of:

(a) pre-treating a polymer composition comprising amylose and/or amylopectin with an aqueous phase comprising one additive selected from the group consisting of at least one acid A having a pKa of equal to or less than 4.8 at 25° C., preferably sulfuric acid, and an enzyme, and optionally one or more additives selected from the group comprising at least one salt in combination with at least one polycarboxylic acid, and at least one hydroxycarboxylic acid, (b) reacting the pre-treated polymer composition with an acylating agent, preferably acetic acid anhydride, to provide an acylated polymer composition comprising amylose and/or amylopectin.

(c) optionally reacting the acylated polymer composition obtained in step (b) with at least one acid A' with a pKa of equal to or less than 4.8 at 25° C., in the presence of water.

Should the disclosure of any patents, patent applications, and publications which are incorporated herein by reference conflict with the description of the present application to the extent that it may render a term unclear, the present description shall take precedence.

The examples which follow are intended to illustrate the present invention without, however, limiting the scope thereof.

EXAMPLES

Example A, Preparation of Starch Acetate Used in Example 2, 4, 6 and 8

100 g of waxy maize with a moisture content of about 12 weight % was mixed with 76 g glacial acetic acid and heated up to 83° C. 0.2 g of sulfuric acid (96% w/w), 0.2 g of distilled water and 4 g of glacial acetic acid were added and 325 g of acetic anhydride (91% w/w), which was pre-cooled to 8° C., was added in portions over 1.5 hours. The temperature of the mixture was kept between 75 and 98° C. After 1 hour, the reaction stopped by addition of water, and a water content of 9 weight % was adjusted in the reaction mixture. The reaction mixture was heated to 93° C., and 0.3 weight % of conc. Sulphuric acid (95-98 w/w) in 5 mL glacial acetic acid were added. The mixture was heated to 93° C. for 1.5 hours. After the reaction, the mixture was precipitated in water to obtain, after filtering, washing, pressing and drying, starch. The starch had the following characteristics:

Glass Transition offset temperature 154° C.

DS 2.4
MW 8000 g/mol
DE 2.4
Viscosity 35 mPas (35 weight % in ethylacetate at 25° C.).

Example 1 (Comparative)

A varnish is prepared in a dissolver with a high speed stirrer comprising 35 parts 70% IPA damped NC (nitrocellulose) 34-A (Nobel NC DLX 3/5), 12.4 parts ethanol, 22.4 parts ethoxypropanol and 30.2 parts ethyl acetate, arriving at a 24.5% binder varnish.

Example 2 (Invention)

A varnish is prepared in a dissolver with a high speed stirrer comprising 35 parts 70% IPA Starch Acetate with a DE of 2.4 and molecular weight of 8000, 12.4 parts ethanol, 22.4 parts ethoxypropanol and 30.2 parts ethyl acetate, arriving at a 24.5% binder varnish.

Example 3 (Comparative)

A pigment base is prepared in a dissolver with a high speed stirrer comprising 11.5 parts 70% IPA damped NC (nitrocellulose) 34-A (Nobel NC DLX 3/5), 25 parts Pigment Blue 15:4, 36.7 parts ethanol, and 26.8 parts ethyl acetate.

Example 4 (Invention)

A pigment base is prepared in a dissolver with a high speed stirrer comprising 11.5 parts 70% IPA Starch Acetate with a DE of 2.4 and molecular weight of 8000, 25 parts Pigment Blue 15:4, 36.7 parts ethanol, and 26.8 parts ethyl acetate.

Example 5 (Comparative)

An ink dilution is prepared in a dissolver with a high speed stirrer comprising 64 parts of example 3, 4 parts 70% polyurethane binder, 21.9 parts of example 1, 10.1 parts solvent mixture (3 parts ethanol, 3 parts ethoxy propanol and 4.1 parts ethyl acetate).

Example 6 (Invention)

An ink dilution is prepared in a dissolver with a high speed stirrer comprising 64 parts of example 4, 4 parts 70% polyurethane binder, 21.9 parts of example 2, 10.1 parts solvent mixture (3 parts ethanol, 3 parts ethoxy propanol and 4.1 parts ethyl acetate).

Example 7 (Comparative)

Example 5 is repeated, but with Pigment Black 7 instead of Pigment Blue 15:4 in example 3.

Example 8 (Invention)

Example 6 is repeated, but with Pigment Black 7 instead of Pigment Blue 15:4 in example 4.

Example 8 and 6 show better particle size distribution, translating to improved wetting and deflocculation properties than examples 7 and 5, which results in an increase in color strength as the dilution of the inks increases.

Example 8 and 6 show dispersibility of the pigments compared to examples 7 and 5.

The invention claimed is:

1. A coating or ink composition comprising:
   at least one starch derivative,
   wherein a dextrose equivalence of the starch derivative is from 1.8 to 2.9, and which optionally further comprises at least one colorant; and
   wherein the at least one starch derivative is an acetylated starch derivative having a degree of substitution (DS) from 2.0 to 2.9 and a molecular weight in the range of 5000 to 20000 g/mol.

2. The coating or ink composition according to claim 1, wherein the branching ratio of the at least one starch derivative is from 1 to 20.

3. The coating or ink composition according to claim 1, wherein the at least one starch derivative has a viscosity from between 10 to 200 mPas (35 weight % in EtOAc at 25° C.).

4. The coating or ink composition according to claim 1, wherein the starch from which the at least one starch derivative was manufactured, had an amylose content of from 0 to 20 weight %.

5. The coating or ink composition according to claim 4 wherein the starch from which the at least one starch derivative was manufactured is a waxy maize starch.

6. The coating or ink composition according to claim 5, wherein the at least one starch derivative has a $T_g$ (glass transition temperature) of from 100 to 180° C.

7. The coating or ink composition according to claim 1, wherein the coating or ink composition comprises at least one colorant in the amount of from 1 to 35 weight %.

8. The coating or ink composition according to claim 1, which comprises at least one colorant, wherein the at least one colorant is selected from the group consisting of dyes, organic and inorganic pigments, wherein the dyes are selected from the group consisting of azo dyes, anthraquinone dyes, xanthene dyes, azine dyes and combinations, wherein organic pigments are selected from the group consisting of Pigment Yellow Numbers 12, 13, 14, 17, 74, 83, Pigment Red Numbers 2, 22, 5 23, 48:1, 48:2, 52, 53, 57:1, 122, 166, 170, 266, Pigment Orange Numbers 5, 16, 34, 36, Pigment Blue Numbers 15, 15:3, 15:4, Pigment Violet Numbers 3, 23, 27 and Pigment Green Number 7, wherein the inorganic pigments are selected from the group consisting of iron oxides, titanium dioxides, chromium oxides, ferric ammonium ferrocyanides, ferric oxide blacks, Pigment Black Number 7, Pigment White 10 Numbers 6 and 7, and wherein the at least one colorant is selected from the group consisting of Pigment Blue 15:4, TiO2 and Pigment Black 7.

9. The coating or ink composition according to claim 1, wherein the coating or ink composition comprises a further component selected from the group consisting of binders and solvents.

10. A method comprising applying the coating composition or ink composition according to claim 1 in a printing process, wherein the printing process is selected from the group consisting of flexography, screen printing, gravure printing and lithography.

11. The method according to claim 10, wherein the coating composition or ink composition is applied to a substrate selected from the group consisting of paper, tissue, fabrics, plastic film, plastic, glass, metal foil, metal foils comprising aluminum.

12. A substrate selected from the group consisting of paper, tissue, fabrics, plastic film, plastic, glass, metal foil, metal foils comprising aluminum, which comprises the coating composition or ink composition according to claim 1.

13. The coating or ink composition according to claim 1, wherein the degree of substitution (DS) of the acetylated starch derivative is from 2.1 to 2.4.

14. The coating or ink composition according to claim 1, wherein the acetylated starch derivative is manufactured according to a process comprising the steps of:
  (a) pre-treating a polymer composition comprising amylose and/or amylopectin with an aqueous phase comprising one additive selected from the group consisting of at least one acid A having a pKa of equal to or less than 4.8 at 25° C., and an enzyme, and optionally one or more additives selected from: at least one salt in combination with at least one polycarboxylic acid, and at least one hydroxycarboxylic acid;
  (b) reacting the pre-treated polymer composition with an acylating agent, to provide an acylated polymer composition comprising acylated amylose and/or acylated amylopectin; and
  (c) reacting the acylated polymer composition obtained in step (b) with at least one acid A' with a pKa of equal to or less than 4.8 at 25° C. in the presence of water to provide the acetylated starch derivative.

15. The process according to claim 14, wherein the at least one acid A comprises sulfuric acid.

16. The process according to claim 15, wherein the acylating agent comprises acetic acid anhydride.

* * * * *